(12) United States Patent
Kasemi et al.

(10) Patent No.: US 10,899,926 B2
(45) Date of Patent: Jan. 26, 2021

(54) CURABLE COMPOSITION

(71) Applicant: SIKA TECHNOLOGY AG, Baar (CH)

(72) Inventors: Edis Kasemi, Zürich (CH); Andreas Kramer, Zürich (CH); Ursula Stadelmann, Zürich (CH); Urs Burckhardt, Zürich (CH); Hans Häberle, Gailingen (DE); Steffen Kelch, Oberengstringen (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/074,894

(22) PCT Filed: Feb. 14, 2017

(86) PCT No.: PCT/EP2017/053318
§ 371 (c)(1),
(2) Date: Aug. 2, 2018

(87) PCT Pub. No.: WO2017/140688
PCT Pub. Date: Aug. 24, 2017

(65) Prior Publication Data
US 2019/0040253 A1    Feb. 7, 2019

(30) Foreign Application Priority Data
Feb. 15, 2016  (EP) .................................. 16155769

(51) Int. Cl.
| | | |
|---|---|---|
| *C08G 59/50* | (2006.01) | |
| *C08G 65/336* | (2006.01) | |
| *C09D 163/00* | (2006.01) | |
| *C09D 175/08* | (2006.01) | |
| *C09J 163/00* | (2006.01) | |
| *C09J 175/08* | (2006.01) | |
| *C09K 3/10* | (2006.01) | |
| *C08L 63/00* | (2006.01) | |
| *C08L 83/04* | (2006.01) | |
| *C08L 71/02* | (2006.01) | |
| *C08L 75/08* | (2006.01) | |

(52) U.S. Cl.
CPC ............. *C08L 75/08* (2013.01); *C08G 59/50* (2013.01); *C08G 65/336* (2013.01); *C08L 63/00* (2013.01); *C09D 163/00* (2013.01); *C09D 175/08* (2013.01); *C09J 163/00* (2013.01); *C09J 175/08* (2013.01); *C09K 3/1021* (2013.01); *C08L 2312/08* (2013.01)

(58) Field of Classification Search
CPC ....... C08G 59/50; C08G 65/336; C08L 63/00; C08L 2312/08; C08L 75/08; C09D 163/00; C09D 175/08; C09J 163/00; C09J 175/08; C09K 3/1021
USPC ........................................................ 525/529
See application file for complete search history.

(56) References Cited

U.S. PATENT DOCUMENTS

| | | | | |
|---|---|---|---|---|
| 5,739,209 | A | * | 4/1998 | Lassila ............... C08G 59/4042 525/113 |
| 2002/0055605 | A1 | * | 5/2002 | Yonehama ........... C07C 211/27 528/93 |
| 2013/0079435 | A1 | * | 3/2013 | Raymond ............... C08G 59/50 523/400 |
| 2014/0275446 | A1 | * | 9/2014 | Kramer ................... C08G 59/50 525/523 |
| 2015/0368466 | A1 | * | 12/2015 | Kelch ................... C08G 59/245 523/402 |

FOREIGN PATENT DOCUMENTS

| | | |
|---|---|---|
| EP | 0 186 191 A2 | 7/1986 |
| EP | 0 370 464 A2 | 5/1990 |
| EP | 2 546 230 A1 | 1/2013 |
| EP | 2 562 223 A1 | 2/2013 |
| WO | WO-2014131757 A1 * | 9/2014 ........... C08G 59/245 |

OTHER PUBLICATIONS

Mar. 8, 2017 International Search Report issued in International Patent Application No. PCT/EP2017/053318.
Jun. 17, 2020 Office Action issued in Chinese Patent Application No. 201780011384.9.

* cited by examiner

*Primary Examiner* — David T Karst
(74) *Attorney, Agent, or Firm* — Oliff PLC

(57) ABSTRACT

A composition including at least one polymer containing silane groups, at least one epoxy resin, and at least one amine of the formula (I). The composition is low in odor, low in toxicity, and highly workable. It enables low-emission products which cure rapidly at ambient temperature to form macroscopically homogeneous films or bodies having good mechanical properties, high thermal stability and good adhesion properties, the mechanical properties being able to be adjusted from very elastic through to tough elastic. The composition is especially suitable as adhesive and/or sealant or coating.

18 Claims, No Drawings

CURABLE COMPOSITION

TECHNICAL FIELD

The invention relates to amine hardeners and curable compositions based on a combination of polymer containing silane groups and of epoxy resin, and also to the use thereof as adhesive, sealant, coating, casting compound or matrix resin.

PRIOR ART

As coatings and high-strength adhesives it is common to use two-component polyurethane systems. These systems cure rapidly at ambient temperature and form a tough elastic material of high strength, but contain low molecular mass isocyanates that are harmful to health, and may form blisters when cured in a humid environment. In a similar way, two-component epoxy resin systems are also used. These systems attain very high strengths, but are not tough elastic or elastic, instead having a high stiffness and relative brittleness and therefore not being suitable for applications requiring a certain stretchability. Oftentimes, moreover, they contain amines that are harmful to health, and in a humid environment are sensitive to what are referred to as blushing effects, possibly resulting in detractions from surface quality, adhesion and strength. Curable materials based on silane-functional polymers are known from application as elastic sealants and adhesives. They are usually in one-component formulations and they crosslink through reaction with atmospheric moisture. They are notable for relatively low toxicity, blister-free curing and high forces of adhesion, but are relatively slow to cure and attain only low strengths. Their resistance to tearing is low, and they are therefore decidedly brittle. Moreover, their thermal stability is relatively low. They are therefore less suitable as coatings and high-strength adhesives. Also known are two-component systems based on a combination of silane-functional polymers with epoxy resins—from EP 0 186 191 and EP 0 370 464, for example. Such systems achieve greater strength and toughness, and also heat resistance, than those based on silane-functional polymers alone, but are still capable of being improved. To cure the epoxy resin, the known systems contain low molecular mass amines or Mannich bases. This gives them increased toxicity and a pronounced and unpleasant amine odor. Furthermore, on application in the cold and/or under high atmospheric humidity, they have a tendency toward curing defects, which are caused by formation of salts (carbamatization) by the amines present with $CO_2$ (known as blushing) and are manifested in particular in the form of reduced ultimate hardness. Moreover, they have a relatively high viscosity and are therefore not easy to work unless diluents are used, resulting in increased emissions.

SUMMARY OF THE INVENTION

It is an object of the present invention to provide a curable material which is low in odor, low in toxicity and has ready workability and which enables low-emission products which cure rapidly at ambient temperature to form macroscopically homogeneous films or bodies having high strength and stretchability.

This object, surprisingly, is achieved by a composition as described in claim 1. The composition is notable for a low odor and a low toxicity. Its viscosity is low and it exhibits hardly any tendency toward carbamatization or blushing effects. As a two-component composition, it has a long shelf life and, after mixing, cures rapidly and without blistering to form an elastic polymer of high strength which has high stability under hot conditions and under UV radiation. This combination of properties enables low-emission products which are easy to apply and work, which cure rapidly in a humid or cold environment, and do so to form highly mechanically robust plastics with an attractive surface that are thermally stable, the possibility existing of adjusting the mechanical properties from very elastic, with not too high a modulus of elasticity and with high strength, through to tough elastic, with a very high modulus of elasticity and a very high strength. The composition is also advantageous especially when for reasons of occupational and health protection the products to be used are to be free of isocyanate.

A surprising feature of the composition of the invention are the good mechanical properties, especially the high strength and high elongation, the low viscosity, and the attractive, nontacky surface. As a result of the low viscosity, the composition can be made particularly workable.

The composition of the invention is particularly suitable as adhesive, sealant, coating, casting compound or matrix resin in the construction and manufacturing industries.

Further aspects of the invention are the subject of further independent claims. Particularly preferred embodiments of the invention are the subject of the dependent claims.

WAYS OF EXECUTING THE INVENTION

The invention provides a composition comprising
at least one polymer containing silane groups,
at least one epoxy resin, and
at least one amine of the formula (I)

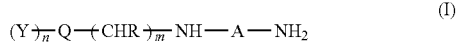

where
A is an alkylene radical having 2 to 15 carbon atoms which optionally contains one or more nitrogen atoms,
R each independently is a hydrogen or methyl or phenyl radical,
Q is a five-, six- or seven-membered cycloalkyl or aryl radical optionally having an oxygen, sulfur or nitrogen atom in the ring and having 4 to 7 carbon atoms,
Y represents identical or different radicals selected from the group consisting of alkyl, alkoxy and dialkylamino having 1 to 18 carbon atoms,
m is 1 or 2, and
n is 0 or 1 or 2 or 3.

In the present document, the term "alkoxysilane group" or "silane group" for short refers to a silyl group which is bonded to an organic radical and has one to three, especially two or three, hydrolyzable alkoxy radicals on the silicon atom.

Correspondingly, the term "organosilane" or "silane" for short refers to an organic compound which contains at least one silane group.

"Aminosilane", "mercaptosilane", "hydroxysilane" and "isocyanatosilane" refer respectively to organosilanes having one or more amino, mercapto, hydroxyl or isocyanate groups on the organic radical in addition to the silane group.

The term "polyether containing silane groups" also encompasses polymers which contain silane groups and which, in addition to polyether units, may also contain urethane groups, urea groups or thiourethane groups. Such polyethers containing silane groups may also be referred to as "polyurethanes containing silane groups".

Substance names beginning with "poly", such as polyol or polyisocyanate, refer to substances containing, in a formal sense, two or more of the functional groups that occur in their name per molecule.

A "primary amino group" refers to an amino group which is bonded to a single organic radical and bears two hydrogen atoms; a "secondary amino group" refers to an amino group which is bonded to two organic radicals which may also together be part of a ring and bears one hydrogen atom; and a "tertiary amino group" refers to an amino group which is bonded to three organic radicals, two or three of which may also be part of one or more rings, and does not bear any hydrogen atom.

An amine or polyamine is said to be "aliphatic" when its amino groups are bonded to an aliphatic or cycloaliphatic or arylaliphatic radical.

An "amine hydrogen" refers to the hydrogen atoms of primary and secondary amino groups.

An "amine hydrogen equivalent weight" refers to the mass of an amine or an amine-containing composition that contains one molar equivalent of amine hydrogen.

"Molecular weight" refers to the molar mass (in g/mol) of a molecule. "Average molecular weight" is understood to mean the number-average $M_n$ of an oligomeric or polymeric mixture of molecules, which is typically determined by means of gel permeation chromatography (GPC) against polystyrene as standard.

"Viscosity" refers to the dynamic viscosity or shear viscosity which is defined by the ratio between the shear stress and the shear rate (speed gradient) and is determined as described in the working examples.

A substance or composition is referred to as "storage-stable" or "storable" when it can be stored at room temperature in a suitable container over a prolonged period, typically over at least 3 months up to 6 months or more, without any change in its application or service properties to an extent relevant for service thereof, as a result of the storage.

The abbreviation "VOC" stands for "volatile organic compounds", i.e. volatile organic substances having a vapor pressure of at least 0.01 kPa at 293.14 K.

"Solvent" is a liquid which dissolves the polymer containing silane groups and/or the epoxy resin and which is a VOC and contains no groups that are reactive toward silane or epoxide groups.

A dotted line in the formulae in this document in each case represents the bond between a substituent and the corresponding molecular radical.

"Room temperature" refers to a temperature of 23° C.

The composition comprises at least one polymer containing silane groups. This is preferably an organic polymer containing silane groups, more particularly a polyolefin, poly(meth)acrylate or polyether or a mixed form of these polymers, each of which bears one or preferably more than one silane group. The silane groups may be pendant from the chain or terminal.

In particular, the polymer containing silane groups is a polyether containing silane groups. This polyether preferably has a majority of oxyalkylene units, more particularly 1,2-oxypropylene units.

The polymer containing silane groups is preferably liquid at room temperature.

The polymer containing silane groups has an average of preferably 1.3 to 4, especially 1.5 to 3, more preferably 1.7 to 2.8, silane groups per molecule. The silane groups are preferably terminal.

Preferred silane groups are trimethoxysilane groups, dimethoxymethylsilane groups or triethoxysilane groups.

The polymer containing silane groups preferably has a mean molecular weight, determined by means of GPC against a polystyrene standard, in the range from 1000 to 30 000 g/mol, especially from 2000 to 20 000 g/mol.

The polymer containing silane groups preferably comprises end groups of the formula (II),

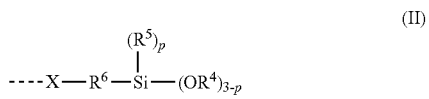

(II)

where
p stands for a value of 0 or 1 or 2, preferably 0 or 1, more particularly 0,
$R^4$ is a linear or branched, monovalent hydrocarbyl radical having 1 to 5 carbon atoms,
$R^5$ is a linear or branched, monovalent hydrocarbyl radical having 1 to 8 carbon atoms, especially methyl or ethyl,
$R^6$ is a linear or branched, divalent hydrocarbyl radical which has 1 to 12 carbon atoms and which optionally contains cyclic and/or aromatic moieties and optionally one or more heteroatoms, especially one or more nitrogen atoms,
X is a divalent radical selected from —O—, —S—, —N($R^7$)—, —N($R^7$)—CO—, —O—CO—N($R^7$)—, —N($R^7$)—CO—O—, —N($R^7$)—CO—N($R^7$)—, —N($R^7$)—CO—O—CH(CH$_3$)—CO—N($R^7$)—, —N($R^7$)—CO—O—CH($R^8$)—CH$_2$—CH$_2$—CO—N($R^7$)— and —N($R^7$)—CO—O—CH(CH$_3$)—CH$_2$—O—CO—N($R^7$)—,
 where
 $R^7$ is a hydrogen atom or is a linear or branched hydrocarbyl radical which has 1 to 20 carbon atoms and which optionally contains cyclic moieties, and which optionally contains an alkoxysilyl group or ether or carboxylic ester groups,
 and $R^8$ is an unbranched alkyl radical having 1 to 6 carbon atoms, more particularly methyl.

Preferably $R^4$ is methyl or is ethyl or is isopropyl.

More preferably, $R^4$ is methyl. Polymers of this kind containing silane groups are particularly reactive.

More preferably, moreover, $R^4$ is ethyl. Polymers of this kind containing silane groups are particularly stable on storage and toxicologically advantageous.

Preferably, $R^5$ is methyl.

Preferably, $R^6$ is 1,3-propylene or 1,4-butylene, where butylene may be substituted by one or two methyl groups.

More preferably, $R^6$ is 1,3-propylene.

Processes for preparing polyethers containing silane groups are known to the person skilled in the art.

In one process, polyethers containing silane groups are obtainable from the reaction of polyethers containing allyl groups with hydrosilanes (hydrosilylation), optionally with chain extension using, for example, diisocyanates.

In another process, polyethers containing silane groups are obtainable from the copolymerization of alkylene oxides and epoxysilanes, optionally with chain extension using, for example, diisocyanates.

In a further process, polyethers containing silane groups are obtainable from the reaction of polyether polyols with isocyanatosilanes, optionally with chain extension using diisocyanates.

In a further process, polyethers containing silane groups are obtainable from the reaction of polyethers containing isocyanate groups, especially NCO-terminated urethane polyethers from the reaction of polyether polyols with a superstoichiometric amount of polyisocyanates, with aminosilanes, hydroxysilanes or mercaptosilanes. Polyethers containing silane groups from this process are particularly preferred. This process enables the use of a multitude of inexpensive starting materials of good commercial availability, by means of which it is possible to obtain different polymer properties, for example high stretchability, high strength, low glass transition temperature, or high resistance to hydrolysis.

Preferred polyethers containing silane groups are obtainable from the reaction of NCO-terminated urethane polyethers with aminosilanes or hydroxysilanes. NCO-terminated urethane polyethers suitable for this purpose are obtainable from the reaction of polyether polyols, especially polyoxyalkylenediols or polyoxyalkylenetriols, preferably polyoxypropylenediols or polyoxypropylenetriols, with a superstoichiometric amount of polyisocyanates, especially diisocyanates.

Preferably, the reaction between the polyisocyanate and the polyether polyol is conducted with exclusion of moisture at a temperature of 50° C. to 160° C., optionally in the presence of suitable catalysts, with metered addition of the polyisocyanate in such a way that the isocyanate groups thereof are present in a stoichiometric excess in relation to the hydroxyl groups of the polyol. More particularly, the excess of polyisocyanate is chosen such that a content of free isocyanate groups in the range from 0.1% to 10% by weight, preferably 0.2% to 5% by weight, more preferably 0.3% to 3% by weight, based on the overall polymer, remains in the resulting urethane polyether after the reaction of all hydroxyl groups.

Preferred diisocyanates are selected from the group consisting of hexamethylene 1,6-diisocyanate (HDI), 1-isocyanato-3,3,5-trimethyl-5-isocyanatomethylcyclohexane (=isophorone diisocyanate or IPDI), tolylene 2,4- and 2,6-diisocyanate and any desired mixtures of these isomers (TDI) and diphenylmethane 4,4'-, 2,4'- and 2,2'-diisocyanate and any desired mixtures of these isomers (MDI). Particular preference is given to IPDI or TDI. Most preferred is IPDI. In this way, polyethers containing silane groups with particularly good lightfastness are obtained.

Especially suitable as polyether polyols are polyoxyalkylenediols or polyoxyalkylenetriols having a degree of unsaturation lower than 0.02 meq/g, especially lower than 0.01 meq/g, and an average molecular weight in the range from 400 to 25 000 g/mol, especially 1000 to 20 000 g/mol.

As well as polyether polyols, it is also possible to use proportions of other polyols, especially polyacrylate polyols or polyester polyols, and also low molecular weight diols or triols.

Suitable aminosilanes for the reaction with an NCO-terminated urethane polyether are primary or secondary aminosilanes. Preference is given to 3-aminopropyltrimethoxysilane, 3-aminopropyldimethoxymethylsilane, 4-aminobutyltrimethoxysilane, 4-amino-3-methylbutyltrimethoxysilane, 4-amino-3,3-dimethylbutyltrimethoxysilane, N-butyl-3-aminopropyltrimethoxysilane, N-phenyl-3-aminopropyltrimethoxysilane, adducts formed from primary amino-silanes such as 3-aminopropyltrimethoxysilane, 3-aminopropyldimethoxy-methylsilane or N-(2-aminoethyl)-3-aminopropyltrimethoxysilane and Michael acceptors such as acrylonitrile, (meth)acrylic esters, (meth)acrylamides, maleic or fumaric diesters, citraconic diesters or itaconic diesters, especially dimethyl or diethyl N-(3-trimethoxysilylpropyl)aminosuccinate. Likewise suitable are analogs of the aminosilanes mentioned with ethoxy or isopropoxy groups in place of the methoxy groups on the silicon.

Suitable hydroxysilanes for the reaction with an NCO-terminated urethane polyether are especially obtainable from the addition of aminosilanes onto lactones or onto cyclic carbonates or onto lactides.

Preferred hydroxysilanes of this kind are N-(3-triethoxysilylpropyl)-2-hydroxypropanamide, N-(3-trimethoxysilylpropyl)-2-hydroxypropanamide, N-(3-triethoxysilylpropyl)-4-hydroxypentanamide, N-(3-triethoxysilylpropyl)-4-hydroxyoctanamide, N-(3-triethoxysilylpropyl)-5-hydroxydecanamide or N-(3-triethoxysilylpropyl)-2-hydroxypropyl carbamate.

Further suitable hydroxysilanes are obtainable from the addition of aminosilanes onto epoxides or from the addition of amines onto epoxysilanes. Preferred hydroxysilanes of this kind are 2-morpholino-4(5)-(2-trimethoxysilylethyl)cyclohexan-1-ol, 2-morpholino-4(5)-(2-triethoxysilyl-ethyl)cyclohexan-1-ol or 1-morpholino-3-(3-(triethoxysilyl)propoxy)propan-2-ol.

Further suitable polyethers containing silane groups are commercially available products, especially the following: MS Polymer™ (from Kaneka Corp.; especially the 5203H, 5303H, S227, S810, MA903 and S943 products); MS Polymer™ or Silyl™ (from Kaneka Corp.; especially the SAT010, SAT030, SAT200, SAX350, SAX400, SAX725, MAX450, MAX951 products); Excestar® (from Asahi Glass Co. Ltd.; especially the S2410, S2420, S3430, S3630 products); SPUR+* (from Momentive Performance Materials; especially the 1010LM, 1015LM, 1050MM products); Vorasil™ (from Dow Chemical Co.; especially the 602 and 604 products); Desmoseal® (from Covestro; especially the S XP 2458, S XP 2636, S XP 2749, S XP 2774 and S XP 2821 products), TEGOPAC® (from Evonik Industries AG; especially the Seal 100, Bond 150, Bond 250 products), Polyvest® (from Evonik; especially the EP ST-M and EP ST-E products), Polymer ST (from Hanse Chemie AG/Evonik Industries AG, especially the 47, 48, 61, 61LV, 77, 80, 81 products); Geniosil® STP (from Wacker Chemie AG; especially the E10, E15, E30, E35 products) or Arufon (from Toagosei, especially the US-6100 or US-6170 products).

The amount of polymer containing silane groups in the composition is preferably in the range from 5 to 80% by weight, more preferably in the range from 10 to 75% by weight, more particularly in the range from 15 to 70% by weight.

The composition further comprises at least one epoxy resin.

Suitable epoxy resins are standard industrial epoxy resins. These are obtained in a known manner, for example from the oxidation of the corresponding olefins or from the reaction of epichlorohydrin with the corresponding polyols, polyphenols or amines.

Particularly suitable epoxy resins are what are called liquid polyepoxide resins, referred to as "liquid resin" hereinafter. These have a glass transition temperature below 25° C.

Likewise possible as epoxy resins are what are called solid resins which have a glass transition temperature above 25° C. and can be comminuted to powders that are pourable at 25° C.

Suitable epoxy resins are especially aromatic epoxy resins, especially the glycidylization products of:

bisphenol A, bisphenol F or bisphenol A/F, where A stands for acetone and F for formaldehyde, which served as reactants for preparation of these bisphenols. In the case of bisphenol F, positional isomers may also be present, especially derived from 2,4'- or 2,2'-hydroxyphenylmethane.

dihydroxybenzene derivatives such as resorcinol, hydroquinone or catechol;

further bisphenols or polyphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4-bis(4-hydroxyphenyl)hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z), 1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'-dihydroxydiphenyl (DOD), 4,4'-dihydroxybenzophenone, bis(2-hydroxynaphth-1-yl)methane, bis(4-hydroxynaphth-1-yl)methane, 1,5-dihydroxynaphthalene, tris(4-hydroxyphenyl)methane, 1,1,2,2-tetrakis(4-hydroxyphenyl)ethane, bis(4-hydroxyphenyl) ether or bis(4-hydroxyphenyl) sulfone;

condensation products of phenols with formaldehyde that are obtained under acidic conditions, such as phenol novolaks or cresol novolaks, also called bisphenol F novolaks;

aromatic amines such as aniline, toluidine, 4-aminophenol, 4,4'-methylenediphenyldiamine, 4,4'-methylenediphenyldi(N-methyl)amine, 4,4'-[1,4-phenylenebis(1-methylethylidene)]bisaniline (bisaniline P) or 4,4'-[1,3-phenylenebis(1-methylethylidene)]bisaniline (bisaniline M).

Further suitable epoxy resins are aliphatic or cycloaliphatic polyepoxides, especially glycidyl ethers of saturated or unsaturated, branched or unbranched, cyclic or open-chain di-, tri- or tetrafunctional $C_2$ to $C_{30}$ alcohols, especially ethylene glycol, propylene glycol, butylene glycol, hexanediol, octanediol, polypropylene glycols, dimethylolcyclohexane, neopentyl glycol, dibromoneopentyl glycol, castor oil, trimethylolpropane, trimethylolethane, pentaerythritol, sorbitol or glycerol, or alkoxylated glycerol or alkoxylated trimethylolpropane;

a hydrogenated bisphenol A, F or A/F liquid resin, or the glycidylization products of hydrogenated bisphenol A, F or A/F;

an N-glycidyl derivative of amides or heterocyclic nitrogen bases, such as triglycidyl cyanurate or triglycidyl isocyanurate, or reaction products of epichlorohydrin with hydantoin.

epoxy resins from the oxidation of olefins such as, in particular, vinylcyclohexene, dicyclopentadiene, cyclohexadiene, cyclododecadiene, cyclododecatriene, isoprene, 1,5-hexadiene, butadiene, polybutadiene or divinylbenzene.

A preferred epoxy resin is a liquid resin.

Particularly preferred as epoxy resin is a liquid resin based on a bisphenol. Most preferred as epoxy resin is a liquid resin based on a diglycidyl ether of bisphenol A, of bisphenol F or of bisphenol A/F, of the kind commercially available, for example, from Dow, Huntsman or Momentive. These epoxy resins have readily manageable viscosity and enable high strengths and resistances. Such liquid resins may also include fractions of solid bisphenol A resin or phenol novolaks.

The composition preferably has an epoxy resin content in the range from 15 to 70 weight %, more preferably 20 to 65 weight %, more particularly 25 to 65 weight %. A composition of this kind exhibits high strength in conjunction with good stretchability.

The composition further comprises at least one amine of the formula (I).

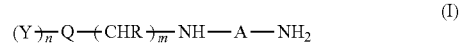

(I)

A is preferably selected from the group consisting of 1,2-ethylene, 1,2-propylene, 1,3-propylene, 2-methyl-1,5-pentylene, 1,6-hexylene, 2,2(4),4-trimethyl-1,6-hexylene, 1,3-cyclohexylenebis(methylene), 1,3-phenylenebis(methylene), (1,5,5-trimethylcyclohexan-1-yl)methane-1,3,3-aza-1,5-pentylene, 3,6-diaza-1,8-octylene, 3,6,9-triaza-1,11-undecylene, 4-aza-1,7-heptylene, 3-aza-1,6-hexylene, 4,7-diaza-1,10-decylene, and 7-aza-1,13-tridecylene.

Preferred among these is 1,2-propylene. These amines have a particularly low tendency toward carbamatization and enable high strengths and particularly high elongations.

Preference among these is also given to 1,3-phenylenebis(methylene). These amines have a low tendency toward carbamatization and enable particularly high strengths.

R independently at each occurrence is preferably a hydrogen radical or is methyl, and more particularly is in each case a hydrogen radical. These amines are particularly easy to obtain and have a particularly low viscosity.

Preferably, Q is an optionally Y-substituted phenyl radical. These amines have a particularly low propensity toward carbamatization.

Y preferably represents identical or different radicals selected from the group consisting of alkyl, alkoxy and dialkylamino each having 1 to 12, especially 1 to 4, carbon atoms. More preferably, Y is methyl or is methoxy or is dimethylamino. Most preferably, Y is methoxy or is dimethylamino.

Preferably, the Y radical is in the meta and/or para position. Where n=1, the Y radical is located in particular in the para position.

n is preferably 0 or 1 or 2, more particularly 0 or 1.

More preferably, n is 0. These amines enable particularly good workability.

If n is 1, Q is especially a Y-substituted phenyl radical and Y is especially methoxy or dimethylamino.

More preferably, A is 1,2-propylene, R is a hydrogen radical, Q is a phenyl radical, m is 1, and n is 0. These amines enable especially good workability, high strength, and particularly high elongation.

With particular preference, moreover, A is 1,3-phenylenebis(methylene), R is a hydrogen radical, Q is a phenyl radical, m is 1 and n is 0. This amine enables particularly good workability and particularly high strength.

With particular preference, moreover, A is 1,3-phenylenebis(methylene), R in each case is a hydrogen radical, Q is a phenyl radical, m is 2, and n is 0. This amine enables particularly good workability and particularly high strength. This amine is available commercially as a constituent of Gaskamine® 240 (from Mitsubishi Gas Chemical).

The amine of the formula (I) is preferably selected from the group consisting of N-benzyl-1,2-ethanediamine, N-(4-methoxybenzyl)-1,2-ethanediamine, N-(4-(dimethylamino) benzyl)-1,2-ethanediamine, $N^1$-benzyl-1,2-propanediamine or $N^2$-benzyl-1,2-propanediamine or a mixture of these isomers, $N^1$-(4-methoxybenzyl)-1,2-propanediamine or $N^2$-(4-methoxybenzyl)-1,2-propanediamine or a mixture of these isomers, $N^1$-(4-(dimethylamino)benzyl)-1,2-propanediamine or $N^2$-(4-(dimethylamino)benzyl)-1,2-propanediamine or a mixture of these isomers, N-benzyl-1,3-bis (aminomethyl)benzene and N-phenylethyl-1,3-bis (aminomethyl)benzene.

Preferred among these is $N^1$-benzyl-1,2-propanediamine or $N^2$-benzyl-1,2-propanediamine or a mixture of these isomers. These amines are obtainable in particular from the reductive alkylation of 1,2-propylenediamine with benzaldehyde and hydrogen. They are used in particular as a reaction product purified by distillation.

Further preferred among these is N-benzyl-1,3-bis(aminomethyl)benzene. This amine is obtainable in particular from the reductive alkylation of 1,3-bis(aminomethyl)benzene with benzaldehyde and hydrogen. It is used in particular as a reaction product containing fractions of N,N'-dibenzyl-1,3-bis(aminomethyl)benzene.

Further preferred among these is N-phenylethyl-1,3-bis (aminomethyl)benzene. It is obtainable in particular from the reaction of 1,3-bis(aminomethyl)benzene with styrene. It is used in particular as a constituent of the commercially available Gaskamine® 240 (from Mitsubishi Gas Chemical).

The preferred amines of the formula (I) are notable for particularly ready accessibility, particularly low viscosity, and good properties when used in accordance with the invention.

The composition preferably has a content of amine of the formula (I) in the range from 1 to 35 weight %, more preferably in the range from 2 to 30 weight %.

The amount of amine of the formula (I) in the composition is preferably such that the number of amine hydrogens in the amine of the formula (I) corresponds to 25 to 150%, more particularly 30 to 130%, of the number of epoxide groups present.

In the composition, the weight ratio between the silane-functional polymer and the epoxy resin is preferably in the range from 10:90 to 90:10, more preferably in the range from 20:80 to 80:20, more particularly in the range from 25:75 to 75:25.

The composition preferably further comprises at least one aminosilane or epoxysilane or mercaptosilane.

A suitable epoxysilane is especially 3-glycidoxypropyltrimethoxysilane or 3-glycidoxypropyldimethoxymethylsilane or 3-glycidoxypropyltriethoxysilane.

A suitable mercaptosilane is especially 3-mercaptopropyltrimethoxysilane or 3-mercaptopropyldimethoxymethylsilane or 3-mercaptopropyltriethoxysilane.

With particular preference the composition comprises at least one aminosilane. A suitable aminosilane is especially selected from the group consisting of 3-aminopropyltrimethoxysilane, N-(2-aminoethyl)-3-aminopropyltrimethoxysilane, 3-amino-2-methylpropyltrimethoxysilane, 4-aminobutyltrimethoxysilane, 4-amino-3,3-dimethylbutyltrimethoxysilane, 3-aminopropyldimethoxymethylsilane, N-(2-aminoethyl)-3-aminopropyldimethoxymethylsilane and N-(2-aminoethyl)-N'-[3-(trimethoxysilyl)propyl] ethylenediamine, and also analogs thereof with ethoxy groups instead of the methoxy groups on the silicon.

Particularly preferred among these is 3-aminopropyltrimethoxysilane, 3-aminopropyltriethoxysilane, N-(2-aminoethyl)-3-aminopropyltrimethoxysilane or N-(2-aminoethyl)-3-aminopropyltriethoxysilane.

The composition preferably contains aminosilane in an amount in the range from 0.1% to 10% by weight, especially in the range from 0.2% to 7% by weight. Such compositions have high strength.

A high aminosilane content enables a particularly high modulus of elasticity and particularly high strengths.

The composition is preferably a two-component composition consisting of a first component and a second component, which are produced, packed and stored separately from one another, the amine of the formula (I) not being present in the same component as the epoxy resin.

Any aminosilane or mercaptosilane present is preferably in the same component as the amine of the formula (I).

Any epoxysilane present is preferably in the same component as the epoxy resin.

With preference all the constituents that are reactive toward epoxy groups are not in the same component as the liquid epoxy resin.

In a preferred embodiment of the invention, the composition comprises a first component comprising
  at least one polymer containing silane groups and
  at least one liquid epoxy resin,
and a second component comprising
  at least one amine of the formula (I) and
  optionally at least one aminosilane.

In a further preferred embodiment of the invention, the composition comprises a first component comprising
  at least one polymer containing silane groups,
  at least one amine of the formula (I), and
  optionally at least one aminosilane,
and a second component comprising
  at least one liquid epoxy resin.

With both of these embodiments, the components on their own are each stable on storage in the absence of moisture. When the two components are mixed, primary and/or secondary amino groups react with epoxide groups that are present. Silane groups react and release alcohol when they come into contact with water.

In one embodiment of the invention, the composition comprises water or a water-releasing substance. A composition of this kind is especially suitable for applications where the absorption of water from the air or from the substrates to which the composition is applied is low. Particular such applications are as an adhesive between materials impervious to diffusion, such as metals, plastics, fiber-reinforced composite materials, glass or ceramic, where the adhesive has virtually no air contact.

The composition preferably contains a total of up to 1 weight % of free or releasable water.

In particular, the ratio between the water contained in or released in the composition and the water required for complete hydrolysis and crosslinking of the silane groups is at least 0.5, preferably at least 1, and at most 5, preferably at most 2.5.

The water may be present in free form or may be bound physically or chemically to a carrier material. Suitable carrier materials for water are porous materials which enclose water within cavities, especially kieselguhr or molecular sieves. Other suitable carrier materials are those which take up water in nonstoichiometric quantities and have a pastelike consistency or form gels, examples being silica gels, clays, polysaccharides or polyacrylic acids which are also known as "superabsorbents" and are employed, for example, in the production of hygiene articles. Carrier materials additionally suitable are polymers in which water can be emulsified such as to form a stable emulsion.

Suitable water-releasing substances are hydrates or aqua complexes, especially inorganic compounds which contain water in coordinatively bonded form or as water of crystallization, more particularly $Na_2SO_4 \cdot 10H_2O$, $CaSO_4 \cdot 2H_2O$, $CaSO_4 \cdot \frac{1}{2}H_2O$, $Na_2B_4O_7 \cdot 10H_2O$, $MgSO_4 \cdot 7H_2O$, the hexaaqua complexes of iron(II), iron(III), cobalt(II), cobalt (III) or nickel(II), $[(H_2O)_4Co(NH_3)_2]^{3+}$ or $[Cl(H_2O)_3Co(NH_3)_2]^{2+}$ Additionally suitable as water-releasing substances are compounds which release water on heating, particularly at a temperature in the range from 50 to 150° C., especially 70 to 130° C., such as, for example, boric acid, aluminum hydroxides or silicas. Especially suitable is boric acid. This compound is preferably in finely dividedly dispersed form. More particularly it has an average particle diameter in the range from 0.01 to 100 µm, preferably 0.1 to 50 µm, more particularly 0.3 to 30 µm.

Further suitable water-releasing substances are compounds which are able to condense with primary amines and release water in the process.

Suitable compounds condensable with primary amines are, in particular:
  ketones, especially acetone, methyl ethyl ketone, methyl isobutyl ketone, methyl amyl ketone, methyl isoamyl ketone, cyclohexanone;
  diketones, especially 1,3-diketones, more particularly 2,4-pentanedione or 3,5-heptanedione, or 1,4-diketones, more particularly 2,5-hexanedione;
  aldehydes, especially propanal, 2-methylpropanal, butanal, 2-methylbutanal, 2-ethylbutanal, pentanal, pivaldehyde, 2-methylpentanal, 3-methylpentanal, 4-methylpentanal, 2,3-dimethylpentanal, hexanal, 2-ethylhexanal, heptanal, octanal, nonanal, decanal, undecanal, 2-methylundecanal, dodecanal, methoxyacetaldehyde, cyclopropanecarbaldehyde, cyclopentanecarbaldehyde, cyclohexanecarbaldehyde, 2,2-dimethyl-3-phenylpropanal, 1-naphthaldehyde, benzaldehyde, salicylaldehyde, 2-methylbenzaldehyde, 3-methylbenzaldehyde, 4-methylbenzaldehyde, 4-methoxybenzaldehyde, 4-dimethylaminobenzaldehyde, 2,2-dimethyl-3-(N,N-bis(methoxyethyl))aminopropanal, 2,2-dimethyl-3-(N-morpholino)propanal, 2,2-dimethyl-3-(N-(2,6-dimethyl)morpholino)propanal, 2,2-dimethyl-3-acetoxypropanal, 2,2-dimethyl-3-isobutyroxypropanal or 2,2-dimethyl-3-lauroyloxypropanal.

In one embodiment of the invention, the composition comprises at least one water-releasing substance in the form of a compound condensable with primary amines. This compound is preferably not in the same component as the amine of the formula (I).

When the components are mixed, the compound condensable with primary amines may react with primary amines that are present, the composition very quickly producing water in extremely fine division and being therefore able to carry out particularly efficient crosslinking of the silane groups present.

The composition may additionally include in particular at least one further amine, which does not conform to the formula (I), and/or at least one accelerator.

Suitable accelerators are substances which accelerate the crosslinking of polymers containing silane groups. Particularly suitable for this purpose are metal catalysts and/or nitrogen-containing compounds.

Suitable metal catalysts are compounds of titanium, zirconium, aluminum, or tin, especially organotin compounds, organotitanates, organozirconates or organoaluminates, these metal catalysts having, in particular, alkoxy groups, aminoalkoxy groups, sulfonate groups, carboxyl groups, 1,3-diketonate groups, 1,3-ketoesterate groups, dialkyl phosphate groups or dialkyl pyrophosphate groups.

Particularly suitable organotin compounds are dialkyltin oxides, dialkyltin dichlorides, dialkyltin dicarboxylates or dialkyltin diketonates, especially dibutyltin oxide, dibutyltin dichloride, dibutyltin diacetate, dibutyltin dilaurate, dibutyltin diacetylacetonate, dioctyltin oxide, dioctyltin dichloride, dioctyltin diacetate, dioctyltin dilaurate or dioctyltin diacetylacetonate, and also alkyltin thioesters.

Particularly suitable organotitanates are bis(ethylacetoacetato)diisobutoxytitanium(IV), bis(ethylacetoacetato)diisopropoxytitanium(IV), bis(acetylacetonato)diisopropoxytitanium(IV), bis(acetylacetonato)diisobutoxytitanium(IV), tris(oxyethyl)amine-isopropoxy-titanium(IV), bis[tris(oxyethyl)-amine]diisopropoxytitanium(IV), bis(2-ethylhexane-1,3-dioxy)titanium(IV), tris[2-((2-aminoethyl)amino)ethoxy]ethoxytitanium(IV), bis(neopentyl(diallyl)oxy)-diethoxytitanium(IV), titanium(IV) tetrabutoxide, tetra (2-ethylhexyloxy) titanate, tetra(isopropoxy) titanate or polybutyl titanate. Especially suitable are the commercially available products Tyzor® AA, GBA, GBO, AA-75, AA-65, AA-105, DC, BEAT, BTP, TE, TnBT, KTM, TOT, TPT or IBAY (all from Dorf Ketal); Tytan PBT, TET, X85, TAA, ET, S2, S4 or S6 (all from Borica Company Ltd.) and Ken-React® KR® TTS, 7, 9QS, 12, 26S, 33DS, 38S, 39DS, 44, 134S, 138S, 133DS, 158FS or LICA® 44 (all from Kenrich Petrochemicals).

Particularly suitable organozirconates are the commercially available products Ken-React® NZ® 38J, KZ® TPPJ, KZ® TPP, NZ® 01, 09, 12 38, 44 or 97 (all from Kenrich Petrochemicals) or Snapcure® 3020, 3030, 1020 (all from Johnson Matthey & Brandenberger).

A particularly suitable organoaluminate is the commercially available product K-Kat 5218 (from King Industries).

Nitrogen-containing compounds with particular suitability as accelerators are amines such as, in particular, N-ethyldiisopropylamine, N,N,N',N'-tetramethylalkylenediamines, polyoxyalkyleneamines, 1,4-diazabicyclo[2.2.2]octane; amidines such as, in particular, 1,8-diazabicyclo[5.4.0]undec-7-ene (DBU), 1,5-diazabicyclo[4.3.0]non-5-ene (DBN), 6-dibutylamino-1,8-diazabicyclo[5.4.0]undec-7-ene; guanidines such as, in particular, tetramethylguanidine, 2-guanidinobenzimidazole, acetylacetoneguanidine, 1,3-di-o-tolylguanidine, 2-tert-butyl-1,1,3,3-tetramethylguanidine, or reaction products of carbodiimides and amines such as, in particular, polyetheramines or aminosilanes; or imidazoles such as, in particular, N-(3-trimethoxysilylpropyl)-4,5-dihydroimidazole or N-(3-triethoxysilylpropyl)-4,5-dihydroimidazole.

Also especially suitable are combinations of different accelerators for the crosslinking of polymers containing silane groups, more particularly combinations of at least one metal catalyst and at least one nitrogen-containing compound.

Preferred are organotin compounds, organotitanates, amines, amidines, guanidines or imidazoles.

Further substances suitable as accelerators are those which accelerate the reaction of epoxide groups with amino groups. Suitable for this purpose are especially acids or compounds hydrolyzable to acids, especially organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic esters, other organic or inorganic acids such as, in particular, phosphoric acid, or mixtures of the aforementioned acids and acid esters; tertiary amines such as, in particular, 1,4-diazabicyclo[2.2.2]octane, benzyldimethylamine, α-methylbenzyldimethylamine, triethanolamine, dimethylaminopropylamine, imidazoles such as, in particular, N-methylimidazole, N-vinylimidazole or 1,2-dimethylimidazole, salts of such tertiary amines, quaternary ammonium salts, such as, in particular, benzyltrimethylammonium chloride, amidines such as, in particular, 1,8-diazabicyclo[5.4.0]undec-7-ene, guanidines such as, in particular, 1,1,3,3-tetramethylguanidine, phenols, especially bisphenols, phenolic resins or Mannich bases such as, in particular, 2-(dimethylaminomethyl)phenol, 2,4,6-tris(dimethylaminomethyl)phenol or polymers of phenol, formaldehyde and N,N-dimethylpropane-1,3-diamine, phosphites such as, in particular, di- or triphenyl phosphites, or compounds having mercapto groups. Preferred are acids, tertiary amines or Mannich bases. Most preferred is salicylic acid or 2,4,6-tris(dimethylaminomethyl)phenol or a combination thereof.

Preferred as further amine are polyamines which have at least three amine hydrogens reactive toward epoxide groups, more particularly the following polyamines:

aliphatic, cycloaliphatic or arylaliphatic primary diamines, especially 2,2-dimethylpropane-1,3-diamine, pentane-1,3-diamine (DAMP), pentane-1,5-diamine, 1,5-diamino-2-methylpentane (MPMD), 2-butyl-2-ethylpentane-1,5-diamine (C11 neodiamine), hexane-1,6-diamine, 2,5-dimethylhexane-1,6-diamine, 2,2(4),4-trimethylhexamethylenediamine (TMD), heptane-1,7-diamine, octane-1,8-diamine, nonane-1,9-diamine, decane-1,10-diamine, undecane-1,11-diamine, dodecane-1,12-diamine, 1,2-, 1,3- or 1,4-diaminocyclohexane, bis(4-aminocyclohexyl)methane ($H_{12}$-MDA), bis(4-amino-3-methylcyclohexyl)methane, bis (4-amino-3-ethylcyclohexyl)methane, bis(4-amino-3,5-dimethylcyclohexyl)methane, bis(4-amino-3-ethyl-5-methylcyclohexyl)methane, 1-amino-3-aminomethyl-3,5,5-trimethylcyclohexane (isophoronediamine or IPDA), 2- or 4-methyl-1,3-diaminocyclohexane or mixtures thereof, 1,3-bis(aminomethyl)cyclohexane, 1,4-bis(aminomethyl)cyclohexane, 2,5(2,6)-bis(aminomethyl)bicyclo[2.2.1]heptane (NBDA), 3(4),8(9)-bis(aminomethyl)tricyclo[5.2.1.0$^{2,6}$]decane, 1,4-diamino-2,2,6-trimethylcyclohexane (TMCDA), menthane-1,8-diamine, 3,9-bis(3-aminopropyl)-2,4,8,10-tetraoxaspiro[5.5]undecane, 1,3-bis(aminomethyl)benzene (MXDA) or 1,4-bis(aminomethyl)benzene;

aliphatic primary di- or triamines containing ether groups, especially bis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine or higher oligomers of these diamines, bis(3-aminopropyl)polytetrahydrofurans or other polytetrahydrofurandiamines, diamines containing cycloaliphatic ether groups from the propoxylation and subsequent amination of 1,4-dimethylolcyclohexane, especially obtainable as Jeffamine® RFD-270 (from Huntsman), or polyoxyalkylenedi- or -triamines that are typically products from the amination of polyoxyalkylenedi- or -triols and are obtainable, for example, under the Jeffamine® name (from Huntsman), under the Polyetheramine name (from BASF) or under the PC Amine® name (from Nitroil). Especially suitable polyoxyalkylenedi- or -triamines are Jeffamine® D-230, Jeffamine® D-400, Jeffamine® D-2000, Jeffamine® EDR-104, Jeffamine® EDR-148, Jeffamine® EDR-176, Jeffamine® T-403, Jeffamine® T-3000, Jeffamine® T-5000, or corresponding amines from BASF or Nitroil;

polyamines having secondary amino groups and having two primary aliphatic amino groups, such as, in particular, 3-(2-aminoethyl)aminopropylamine, bis(hexamethylene)triamine (BHMT), diethylenetriamine (DETA), triethylenetetramine (TETA), tetraethylenepentamine (TEPA), pentaethylenehexamine (PEHA) or higher homologs of linear polyethyleneamines such as polyethylenepolyamine having 5 to 7 ethyleneamine units (called "higher ethylenepolyamine", HEPA), products from the multiple cyanoethylation or cyanobutylation and subsequent hydrogenation of primary di- and polyamines having at least two primary amino groups, such as dipropylenetriamine (DPTA), N-(2-aminoethyl)propane-1,3-diamine (N3 amine), N,N'-bis(3-aminopropyl)ethylenediamine (N4 amine), N,N'-bis(3-aminopropyl)-1,4-diaminobutane, N5-(3-aminopropyl)-2-methylpentane-1,5-diamine, N3-(3-aminopentyl)pentane-1,3-diamine, N5-(3-amino-1-ethylpropyl)-2-methylpentane-1,5-diamine or N,N'-bis(3-amino-1-ethylpropyl)-2-methylpentane-1,5-diamine;

polyamines having tertiary amino groups, such as, in particular, N,N-dimethyldi(1,3-propylene)triamine (DMAPAPA), N,N'-bis(aminopropyl)piperazine, N,N-bis(3-aminopropyl)methylamine, N,N-bis(3-aminopropyl)ethylamine, N,N-bis(3-aminopropyl)propylamine, N,N-bis(3-aminopropyl)cyclohexylamine, N,N-bis(3-aminopropyl)-2-ethylhexylamine, products from the double cyanoethylation and subsequent reduction of fatty amines derived from natural fatty acids, such as N,N-bis(3-aminopropyl)dodecylamine or N,N-bis(3-aminopropyl)tallowalkylamine, available as Triameen® Y12D or Triameen® YT (from Akzo Nobel);

aliphatic, cycloaliphatic or arylaliphatic primary triamines, especially 4-aminomethyloctane-1,8-diamine, 1,3,5-tris(aminomethyl)benzene, 1,3,5-tris(aminomethyl)cyclohexane, tris(2-aminoethyl)amine, tris(2-aminopropyl)amine or tris(3-aminopropyl)amine;

diamines having one primary and one secondary amino group, especially products from the reductive alkylation of primary aliphatic polyamines with aldehydes or ketones, such as, in particular, N-benzyl-1,3-bis(aminomethyl)benzene, N-2-ethylhexyl-1,3-bis(aminomethyl)benzene, or partially styrenized polyamines such as, in particular, styrenized MXDA (available as Gaskamine® 240 from Mitsubishi Gas Chemical);

Mannich bases obtained from the reaction of phenols with aldehydes, especially formaldehyde, and aliphatic or cycloaliphatic amines, especially phenalkamines, i.e., Mannich bases of cardanol (long-chain alk(en)ylphenols and -resorcinols obtained by thermal treatment of cashewnut-shell oil extracts, containing as main component 3-(pentadeca-8,11,14-trienyl)phenol, more particularly the commercial products Cardolite® NC-540, NC-557, NC-558, NC-566, Lite 2002, GX-6019, GX-6013, NX-4943, NX-5607 or NX-5608 (from Cardolite), Aradur® 3440, 3441, 3442 or 3460 (from Huntsman), or Beckopox® EH 614, EH 621, EH 624, EH 628 or EH 629 (from Cytec);

aromatic polyamines such as, in particular, m- and p-phenylenediamine, 4,4'-, 2,4'- and/or 2,2'-diaminodiphenylmethane, 3,3'-dichloro-4,4'-diaminodiphenylmethane (MOCA), tolylene-2,4- and/or -2,6-diamine, mixtures of 3,5-dimethylthiotolylene-2,4- and -2,6-diamine (available as Ethacure® 300 from Albermarle), mixtures of 3,5-diethyltolylene-2,4- and -2,6-diamine (DETDA, available as Ethacure® 100 from Albermarle), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 4,4'-diaminodiphenylsulfone (DDS), 4-amino-N-(4-aminophenyl)benzenesulfonamide, 5,5'-methylenedianthranilate, propylene 1,3-bis(4-aminobenzoate), butylene 1,4-bis(4-aminobenzoate), polytetramethylene oxide bis(4-aminobenzoate) (available as Versalink® from Air Products), 1,2-bis(2-aminophenylthio)ethane, 2-methylpropyl 4-chloro-3,5-diaminobenzoate or tert-butyl (4-chloro-3,5-diaminobenzoate);

polyamidoamines, especially reaction products of a mono- or polybasic carboxylic acid, or the esters or anhydrides thereof, especially a dimer fatty acid, with an aliphatic, cycloaliphatic or aromatic polyamine used in a stoichiometric excess, especially a polyalkyleneamine, for example DETA or TETA, especially the commercially available polyamidoamines Versamid® 100, 125, 140 or 150 (from Cognis), Aradur® 223, 250 or 848 (from Huntsman), Euretek® 3607 or 530 (from Huntsman) or Beckopox® EH 651, EH 654, EH 655, EH 661 or EH 663 (from Cytec);

or adducts of polyamines with epoxides or epoxy resins, especially adducts with diepoxides in a molar ratio of about 2/1, or adducts with monoepoxides in a molar ratio of about 1/1, or reaction products of polyamines and epichlorohydrin, especially that of 1,3-bis(aminomethyl)benzene, commercially available as Gaskamine® 328 (from Mitsubishi Gas Chemical).

Preferred as further amine are primary aliphatic diamines having a molecular weight of at least 120 g/mol, especially at least 150 g/mol, preferably TMD, H$_{12}$-MDA, IPDA, 2- or 4-methyl-1,3-diaminocyclohexane or mixtures thereof, 1,3-bis(aminomethyl)cyclohexane, 1,4-bis(aminomethyl)cyclohexane, NBDA, MXDA or BHMT, especially TMD, H$_{12}$-MDA, IPDA, NBDA, or BHMT.

Preferred as further amine are also aliphatic primary di- or triamines containing ether groups, especially polyoxyalkylenedi- or -triamines having an average molecular weight in the range from 200 to 500 g/mol, especially Jeffamine® D-230 or Jeffamine® D-400 or Jeffamine® T-403 (all from Huntsman), or cycloaliphatic diamines containing ether groups from the propoxylation and subsequent amination of 1,4-dimethylolcyclohexane, especially Jeffamine® RFD-270 (from Huntsman).

Preferred as further amine are also adducts, containing at least three amine hydrogens, of at least one polyamine having 2 to 12 carbon atoms and at least one epoxide, more particularly an adduct which contains at least three amine hydrogens and is the adduct of at least one polyamine with at least one aromatic monoepoxide, the molar ratio of this reaction having been around 1/1. The polyamine was especially present in excess during the reaction and has been removed by means of distillation after the reaction. A preferred aromatic monoepoxide is cresyl glycidyl ether and a preferred polyamine is 1,2-ethylenediamine, 1,2-propylenediamine, 1,3-propylenediamine or MPMD, especially 1,2-propylenediamine or MPMD.

Further amines are present in the composition preferably in an amount such that at most 60%, especially at most 45%, of the amine hydrogens in the composition originate from further amines.

The composition is preferably largely free of amines having a molecular weight below 150 g/mol, especially below 120 g/mol. It preferably contains less than 1 weight %, especially less than 0.5 weight %, of amines having a molecular weight below 150 g/mol, especially below 120 g/mol. A composition of this kind is particularly advantageous in terms of toxicology and odor.

The composition may comprise further substances reactive toward epoxide groups, examples being monoamines such as hexylamine or benzylamine or polyethermonoamines, especially alcohol-started products such as Jeffamine® M-600, Jeffamine® M-1000, Jeffamine® M-2005, Jeffamine® M-2070, Jeffamine® XTJ-581, Jeffamine® XTJ-249 or Jeffamine® XTJ-435, or alkylphenol-started products such as Jeffamine® XTJ-436 (all from Huntsman), or compounds containing mercapto groups, especially the following:

liquid mercaptan-terminated polysulfide polymers, known by the Thiokol® brand name (from Morton Thiokol; available, for example, from SPI Supplies, or from Toray Fine Chemicals), especially the LP-3, LP-33, LP-980, LP-23, LP-55, LP-56, LP-12, LP-31, LP-32 or LP-2 products; and also known by the Thioplast® brand name (from Akzo Nobel), especially the G 10, G 112, G 131, G 1, G 12, G 21, G 22, G 44 or G 4 products;

mercaptan-terminated polyoxyalkylene ethers obtainable, for example, by reaction of polyoxyalkylenedi- or -triols either with epichlorohydrin or with an alkylene oxide, followed by sodium hydrogensulfide;

mercaptan-terminated compounds in the form of polyoxyalkylene derivatives, known by the Capcure® brand name (from Cognis), especially the WR-8, LOF or 3-800 products;

polyesters of thiocarboxylic acids, for example pentaerythritol tetramercaptoacetate, trimethylolpropane trimercaptoacetate, glycol dimercaptoacetate, pentaerythritol tetra(3-mercaptopropionate), trimethylolpropane tri(3-mercaptopropionate) or glycol di(3-mercaptopropionate), or esterification products of polyoxyalkylenediols or -triols, ethoxylated trimethylolpropane or polyester diols with thiocarboxylic acids such as thioglycolic acid or 2- or 3-mercaptopropionic acid; or further compounds having mercapto groups, such as, in particular, 2,4,6-trimercapto-1,3,5-triazine, 2,2'-(ethylenedioxy)diethanethiol (triethylene glycol dimercaptan) or ethanedithiol.

Further suitable constituents of the composition are in particular the following auxiliaries and adjuvants:

adhesion promoters and/or crosslinkers, especially (meth)acrylosilanes, anhydridosilanes, carbamatosilanes, alkylsilanes or iminosilanes, or oligomeric forms of these silanes, or adducts of primary aminosilanes with epoxysilanes or (meth)acrylosilanes or anhydridosilanes;

plasticizers, especially carboxylic esters such as phthalates, especially diisononyl phthalate (DINP), diisodecyl phthalate (DIDP) or di(2-propylheptyl) phthalate (DPHP), hydrogenated phthalates, especially hydrogenated diisononyl phthalate (DINCH), terephthalates, especially dioctyl terephthalate, trimellitates, adipates, especially dioctyl adipate, azelates, sebacates, polyols, especially polyoxyalkylene polyols or polyester polyols, benzoates, glycol ethers, glycol esters, organic phosphoric, phosphonic or sulfonic esters, polybutenes, polyisobutenes, or plasticizers derived from natural fats or oils, especially epoxidized soybean oil or linseed oil;

solvents, diluents or extenders, such as especially xylene, 2-methoxyethanol, dimethoxyethanol, 2-ethoxyethanol, 2-propoxyethanol, 2-isopropoxyethanol, 2-butoxyethanol, 2-phenoxyethanol, 2-benzyloxyethanol, benzyl alcohol, ethylene glycol, ethylene glycol dimethyl ether, ethylene glycol diethyl ether, ethylene glycol dibutyl ether, ethylene glycol diphenyl ether, diethylene glycol, diethylene glycol monomethyl ether, diethylene glycol monoethyl ether, diethylene glycol mono-n-butyl ether, diethylene glycol dimethyl ether, diethylene glycol diethyl ether, diethylene glycol di-n-butyl ether, propylene glycol butyl ether, propylene glycol phenyl ether, dipropylene glycol, dipropylene glycol monomethyl ether, dipropylene glycol dimethyl ether, dipropylene glycol di-n-butyl ether, N-methylpyrrolidone, diphenylmethane, diisopropylnaphthalene, mineral oil fractions, for example Solvesso® products (from Exxon), alkylphenols such as tert-butylphenol, nonylphenol, dodecylphenol or cardanol (from cashew-nut-shell oil, containing, as main constituent, 3-(8,11,14-pentadecatrienyl)phenol), styrenized phenol, bisphenols, aromatic hydrocarbon resins, especially types containing phenol groups, alkoxylated phenol, especially ethoxylated or propoxylated phenol, especially 2-phenoxyethanol, adipates, sebacates, phthalates, benzoates, organic phosphoric or sulfonic esters or sulfonamides;

reactive diluents, especially reactive diluents for epoxy resins such as cresyl glycidyl ether, benzyl glycidyl ether, tert-butylphenyl glycidyl ether, nonylphenyl glycidyl ether, 2-ethylhexyl glycidyl ether, glycidyl ethers of natural alcohols such as, in particular, $C_8$- to $C_{10}$-alkyl glycidyl ethers or $C_{12}$- to $C_{14}$-alkyl glycidyl ethers, or glycidyl ethers of diols or polyols such as polypropylene glycols, dimethylolcyclohexane, glycerol, neopentyl glycol or trimethylolpropane, or, additionally, epoxidized natural oils such as soybean oil, linseed oil or palm kernel oil, or compounds containing acetoacetate groups, especially acetoacetylated polyols, or butyrolactone or carbonates or aldehydes or isocyanates, or silicones containing reactive groups;

inorganic or organic fillers, especially ground or precipitated calcium carbonates, optionally coated with fatty acids, especially stearates; baryte (heavy spar), talc, quartz flour, quartz sand, iron mica, dolomite, wollastonite, kaolin, mica (potassium aluminum silicate), molecular sieve, aluminum oxide, aluminum hydroxide, magnesium hydroxide, silica, cement, gypsum, fly ash, carbon black, graphite, metal powders such as aluminum, copper, iron, zinc, silver or steel, PVC powders or hollow spheres;

fibers, especially glass fibers, carbon fibers, metal fibers, ceramic fibers, polymer fibers such as polyamide fibers or polyethylene fibers, or natural fibers such as wool, cellulose, hemp or sisal;

inorganic or organic pigments, especially titanium dioxide, chromium oxide or iron oxide;

dyes;

dryers, especially tetraethoxysilane, vinyltrimethoxysilane, vinyltriethoxysilane or organosilanes having a functional group in the a position to the silane group, especially N-(methyldimethoxysilylmethyl)-O-methylcarbamate, (methacryloyloxymethyl)silanes, methoxymethylsilanes, orthoformic esters, and also calcium oxide or molecular sieves;

rheology modifiers, especially thickeners, especially sheet silicates such as bentonites, derivatives of castor oil such as hydrogenated castor oil, polyamides, polyurethanes, urea compounds, polyvinyl chlorides, fumed silicas;

natural resins, fats or oils such as rosin, shellac, linseed oil, castor oil or soybean oil;

nonreactive polymers, especially homo- or copolymers of unsaturated monomers, especially from the group comprising ethylene, propylene, butylene, isobutylene, isoprene, vinyl acetate or alkyl (meth)acrylates, especially polyethylenes (PE), polypropylenes (PP), polyisobutylenes, ethylene-vinyl acetate copolymers (EVA) or atactic poly-α-olefins (APAO);

flame-retardant substances, especially the aluminum hydroxide or magnesium hydroxide fillers already mentioned, or boron compounds, antimony trioxide or phosphorus, or, in particular, organic phosphoric esters such as, in particular, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenyl phosphate), bisphenol A bis (diphenyl phosphate) or ammonium polyphosphates; or additives, especially wetting agents, flow control agents, defoamers, deaerators, stabilizers against oxidation, heat, light or UV radiation, or biocides.

It may be useful to dry certain constituents chemically or physically before mixing them into the composition, particularly if they are to be stored together with the polymer containing silane groups.

In the case of a two-component composition, such further constituents may be part of the first component or of the second component. Free water is preferably not in the same component as the polymer containing silane groups. Further constituents that are reactive toward epoxide groups are preferably not in the same component as the epoxy resin.

In the composition, the ratio between the number of groups reactive toward epoxide groups relative to the number of epoxide groups is preferably in the range from 0.5 to 1.5, especially in the range from 0.8 to 1.2.

The composition preferably contains only a low content of solvents. It contains preferably 200 g VOC per liter or less, especially 150 g VOC per liter or less, more preferably 100 g VOC per liter or less, very preferably 50 g VOC per liter or less. In particular it is largely free of solvents.

The composition is in particular produced and used as a two-component composition. In this case the two components are produced and stored separately in the absence of moisture. They are typically each stored in a separate container. The separate components are storage-stable; this means that each component can be stored prior to use for several months up to half a year or longer, without any change in their respective properties to an extent relevant to their service. A suitable container for storage of the respective component is especially a vat, a hobbock, a pouch, a bucket, a can, a cartridge or a tube.

For the use of the composition, the two components are mixed with one another shortly before or during the application. The mixing ratio is selected preferably such that the groups reactive toward epoxide groups are present in a suitable ratio to the epoxide groups, as described above. In parts by weight, the mixing ratio between the two components is typically in the range from 1:10 to 10:1.

The two components are mixed by a suitable method; mixing may take place continuously or batchwise, using a static mixer or by means of a dynamic mixer. If the mixing precedes the application, care must be taken to ensure that application takes place within the open time or potlife of the composition, since otherwise there may be disruptions, such as retarded or incomplete development of adhesion to the substrate or premature gelling, for example. The "open time" or else "potlife" here is the time which elapses between the mixing of the components and the point in time at which it is no longer possible for composition to be properly applied. A typical measure of the end of the potlife is the attainment of a defined viscosity value.

Mixing takes place preferably at ambient temperature, which is typically within the range from about 5 to 50° C., preferably at about 10 to 30° C.

Curing by chemical reaction begins with the mixing of the two components. Here, the epoxide groups enter into a ring-opening reaction with primary and secondary amino groups to form amino alcohol units. Further epoxide groups react with themselves in anionic polymerization. The silane groups undergo hydrolysis with release of alcohol, forming silanol groups (Si—OH groups) and, through subsequent condensation reactions, siloxane groups (Si—O—Si groups). As a result of these and possibly further reactions, the composition cures to give a crosslinked polymer. If the water for hydrolysis of the silane groups was not already present in the composition or has been released therein, it may come from the air (atmospheric humidity) or from a substrate, or the composition may be contacted, by coating, spraying or mixed incorporation, for example, with a water-containing component.

Curing takes place in particular at a temperature in the range from 0 to 150° C. It may in particular take place at ambient temperature, in which case it extends typically over several days to weeks until it is largely at an end under the prevailing conditions. Alternatively, curing may take place at elevated temperature, more particularly at a temperature in the range from 50 to 130° C. In certain cases it may be advantageous for a composition partly cured at ambient temperature to be aftercured or completely cured at an elevated temperature.

The curing profile of the composition is preferably such as on the one hand to ensure a sufficient potlife or open time, for correct application of the composition, and such that on the other hand the curing has rapidly advanced to a point where the composition can be released for traffic or can be worked on further, or where a bond implemented using the composition is self-supporting and can be transported.

A further subject of the invention is therefore a cured composition obtained from the composition described by mixing all of the ingredients and/or components of the composition, applying the mixed composition, and curing the applied composition.

The cured composition has outstanding mechanical properties, very good thermal stability and good adhesion properties. Depending on the nature and amount of the ingredients, the mechanical properties can be adjusted from very elastic, with not too high a modulus of elasticity and with high strength, through to tough elastic, with a very high modulus of elasticity and very high strength. As a result, the composition is suitable for a multiplicity of applications.

The composition is especially suitable for use as adhesive, sealant, coating, casting compound or matrix resin for construction and industrial applications. As adhesive, the composition is especially suitable for structural bonding in the construction or manufacturing industries, more particularly as assembly adhesive, anchoring adhesive, bodywork adhesive, element adhesive for bridges, for example, sandwich element adhesive, architectural facing element adhesive, reinforcing adhesive or half-shell adhesive for rotor blades. As a sealant, the composition is especially suitable for the sealing of joints, gaps, seams or vacancies of all kinds, particularly in the construction and manufacturing industries.

As a coating, the composition is especially suitable as a covering, coating, paint, varnish, seal, priming coat or primer for construction and industrial applications, more particularly as a floor coating for interiors or in the exterior segment for balconies, patios, parking levels, bridges or roofs, or as a protective coating for concrete, cement, metals, plastics or wood. After such a coating has been applied and—at least partly—cured, a further coating, a further covering or a further paint coat may be applied to it, this further coat being able to be likewise a composition of the invention or a different material, more particularly an epoxy resin coating or a polyurethane or polyurea coating. As a casting compound, the composition is especially suitable as an electrical encapsulating compound.

As a matrix resin, the composition is especially suitable as a fiber composite matrix for fiber composite materials such as CRP or GRP.

The composition is especially suitable for use as an adhesive and/or sealant or as a coating.

The composition here is particularly suitable for the bonding, sealing or coating of the following substrates:
glass, glass-ceramic, screen-printed ceramic, concrete, mortar, brick, tile, gypsum, natural rocks such as granite or marble, or glass mineral fiber mats;
metals or alloys such as aluminum, iron, steel and non-ferrous metals, or surface-finished metals or alloys such as galvanized or chromed metals;
leather, textiles, paper, wood, woodbase materials bonded with resins, e.g. phenolic, melamine or epoxy resins, resin-textile composites or further polymer composites;
polymers, especially rigid or flexible PVC, ABS, polycarbonate (PC), polyamide (PA), polyesters, PMMA, epoxy resins, PUR, POM, PO, PE, PP, EPM or EPDM, where the polymers have optionally been surface-treated by means of plasma, corona or flames;
fiber-reinforced plastics, such as carbon fiber-reinforced plastics (CRP), glass fiber-reinforced plastics (GRP) or sheet molding compounds (SMC);
coated substrates such as powder-coated metals or alloys;
paints or varnishes, especially automotive topcoats.

The substrates can be pretreated if required prior to the application of the composition. Pretreatments of this kind especially include physical and/or chemical cleaning methods, for example sanding, sandblasting, shotblasting, brushing and/or blowing, and also treatment with detergents or solvents, or the application of an adhesion promoter, an adhesion promoter solution or a primer.

The result of use as adhesive and/or sealant or coating is an article bonded and/or sealed or coated with the composition. The article, then, comprises an at least partly cured composition as described above.

The article is more particularly a house, a bathroom, a kitchen, a roof, a balcony, a patio, a parking level, a bridge, a tunnel, a road, a sandwich element of a lightweight structure, a solar panel such as photovoltaic or solarthermal modules, a glass architectural facing element, a window, a sheet, a mirror, a basin, a white good, a household appliance, a dishwasher, a washing machine, an oven, a wind turbine rotor blade, an automobile, a bus, a truck, a rail vehicle, a boat, an aircraft, a helicopter, or a headlight; or a component for installation in or on such an article.

EXAMPLES

Adduced hereinafter are working examples which are intended to elucidate the invention described in detail. It will be appreciated that the invention is not restricted to these described working examples.

"ANEW" stands for amine hydrogen equivalent weight.
"EEW" stands for epoxy equivalent weight.
"Standard conditions" refer to a temperature of 23±1° C. and a relative air humidity of 50±5%. "SC" stands for "standard conditions".
Description of Measuring Methods:
Viscosity was measured on a thermostated Rheotec RC30 cone-plate viscometer (cone diameter 50 mm, cone angle 1°, cone tip-plate distance 0.05 mm, shear rate 10 rpm).
Amine value was determined by means of titration (with 0.1N $HClO_4$ in acetic acid versus crystal violet).
Polymer Containing Silane Groups Used:
STP Polymer-1:
In the absence of moisture, 1000 g of Acclaim® 12200 polyol (from Bayer; low monol polyoxypropylenediol, OH number 11.0 mg KOH/g, water content around 0.02 wt %), 43.6 g of isophorone diisocyanate (Vestanat® IPDI from Evonik Industries), 126.4 g of diisodecyl phthalate and 0.12 g of dibutyltin dilaurate were heated to 90° C. with continuous stirring and left at this temperature until the free isocyanate group content as determined by titrimetry had reached a value of 0.63 wt %. Subsequently, 62.3 g of diethyl N-(3-trimethoxysilylpropyl)aminosuccinate were mixed in and the mixture was stirred at 90° C. until it was no longer possible to detect any free isocyanate by means of FT-IR spectroscopy. The silane-functional polymer was cooled to room temperature and stored in the absence of moisture. It was liquid at room temperature and had a viscosity at 20° C. of 99 Pa·s.

STP Polymer-1 contains 10 weight % of plasticizer (diisodecyl phthalate).
Epoxy Resin Used:
Araldite® GY 250:
bisphenol A diglycidyl ether, EEW 187.5 g/eq (from Huntsman)
Amines of the Formula (I) Used:
N-Benzylpropane-1,2-diamine:
A round-bottom flask was initially charged with 444.8 g (6 mol) of propane-1,2-diamine under a nitrogen atmosphere at room temperature. With good stirring, a solution of 212.2 g (2 mol) of benzaldehyde in 1500 mL of isopropanol was slowly added dropwise, and the mixture was stirred for 2 hours. The reaction mixture was then hydrogenated in a continuous hydrogenation apparatus with a Pd/C fixed bed catalyst at a hydrogen pressure of 90 bar, a temperature of 85° C. and a flow rate of 5 mL/min. To monitor the reaction, IR spectroscopy was used to check whether the imine band at about 1665 $cm^{-1}$ had disappeared. Thereafter, the hydrogenated solution was concentrated on a rotary evaporator at 65° C., removing unreacted propane-1,2-diamine and isopropanol. A clear, pale yellowish liquid was obtained. 300 g of this were distilled at 80° C. under reduced pressure, with collection of 237.5 g of distillate at a vapor temperature of 60 to 63° C. and 0.08 to 0.09 bar. A colorless liquid having an amine value of 682 mg KOH/g was obtained, which, by $^1$H NMR, was a mixture of $N^1$-benzylpropane-1,2-diamine and $N^2$-benzylpropane-1,2-diamine in a ratio of about 2/1 and had a GC purity of >97%.

Gaskamine® 240:
styrenized 1,3-bis(aminomethyl)benzene, AHEW 103 g/eq (from Mitsubishi Gas Chemical)
Further Substances Used:
DBTDL 10%: dibutyltin(IV) dilaurate, 10% by weight in diisodecyl phthalate
Silquest® A-1120: N-(2-aminoethyl)-3-aminopropyltrimethoxysilane, AHEW 74.1 g/eq (from Momentive)
Ancamine® K54: 2,4,6-tris(dimethylaminomethyl)phenol (from Air Products)
Jeffamine® D-230: polyetherdiamine with average molecular weight of 230 g/mol, AHEW 60 g/eq (from Huntsman)
Jeffamine® D-400: polyetherdiamine with average molecular weight of 430 g/mol, AHEW 115 g/eq (from Huntsman)
Vestamin® TMD: 2,2(4),4-trimethylhexamethylenediamine, AHEW 39.6 g/eq (from Evonik)
Vestamin® IPD: 3-aminomethyl-3,5,5-trimethylcyclohexylamine, AHEW 42.6 g/eq (from Evonik)
EP adduct 1: reaction product of 1,5-diamino-2-methylpentane and Araldite® DY-K, prepared as described hereinafter; AHEW 106.5 g/eq EP adduct 1 was prepared by heating an initial charge of 4.65 kg of 1,5-diamino-2-methylpentane (Dytek® A from Invista) under a nitrogen atmosphere to 70° C. and then, with good stirring, slowly adding 1.83 kg of Araldite® DY-K, in the course of which the temperature of the reaction mixture was 70 to 80° C. After 1 hour at 80° C., the reaction mixture was cooled down and 1,5-diamino-2-methylpentane and further volatile constituents were removed by distillation by means of a thin-film evaporator (0.5-1 mbar, jacket temperature 160° C.).
Production of Two-Component Compositions:
For each example, the ingredients specified in tables 1 to 3 were mixed in the specified amounts (in parts by weight) of component-1 by means of a centrifugal mixer (Speed-Mixer™ DAC 150, FlackTek Inc.) and stored with exclusion of moisture.
Similarly, the ingredients of component-2 specified in tables 1 to 3 were processed and stored.
Subsequently, the two components of each composition were processed by means of the centrifugal mixer to give a homogeneous liquid and this was tested immediately as follows:
1 minute after mixing, the viscosity was determined at 20° C.
To measure the time until the composition became free from tack, abbreviated to "TFT", a small portion of the mixed composition at room temperature was applied in a layer thickness of around 3 mm to cardboard and, under standard conditions, a determination was made of the time which elapsed until an LDPE pipette used to gently touch the surface of the composition for the first time no longer had any residues left on it.

The tensile strength, the elongation at break and the elasticity modulus at 0.5 to 5.0% elongation (modulus of elasticity 5%) were determined according to DIN EN 53504 on flat specimens with a length of 75 mm, with a gage length of 30 mm and a gage width of 4 mm, produced by punching from films with a thickness of around 2 mm of the composition cured under the respective reported conditions. The values designated by "10d SC" and "14d SC" in the tables were determined after storage times of 10 and 14 days, respectively, under standard conditions. The values designated "+2d 80° C." were determined on flat specimens which had been stored for 10 days under standard conditions and subsequently for 2 days in a forced air oven at 80° C. For examples Z-1 to Z-7 and Ref-1 to Ref-4, these values were determined with a pulling speed of 200 mm/min. For examples Z-8 to Z-10 and Ref-5 to Ref-8, they were determined with a pulling speed of 10 mm/min.

Shore A hardness was determined according to DIN 53505 on test specimens cured under standard conditions for 14 days. The value in this case was determined in each case on the top, on the side of the test specimen facing the air. Additionally, the test specimen was turned over and a determination was likewise made on the bottom, on the side not exposed to the air. The two values are reported as "top/bottom" in table 2. Here, values for top and bottom that are very similar are a sign of complete and undisrupted curing.

After 14 days under SC, the appearance of all the films was rated visually. After curing, all of the films were absolutely nontacky, free from blisters, and either nontransparently white, or opaque to semitransparent (referred to as "opaque-transparent"), or almost transparent, or transparent, in each case with a glossy to silk-matt surface. Example Ref-4 showed streaking on the surface. The results are reported in tables 1 to 3.

Examples Z-1 to Z-10 are inventive compositions. Examples Ref-1 to Ref-8 are comparative examples.

TABLE 1

Composition and properties of examples Z-1 to Z-3 and of comparative examples Ref-1 to Ref-2.

| Example | Z-1 | Z-2 | Z-3 | Ref-1 | Ref-2 |
|---|---|---|---|---|---|
| Component-1: | | | | | |
| STP Polymer-1 | 53.0 | 53.0 | 53.0 | 53.0 | 53.0 |
| Araldite ® GY 250 | 38.0 | 38.0 | 38.0 | 38.0 | 38.0 |
| DBTDL 10% | 2.0 | 2.0 | 2.0 | 2.0 | 2.0 |
| Dioctyl adipate | 7.0 | 7.0 | 7.0 | 7.0 | 7.0 |
| Component-2: | | | | | |
| Silquest ® A-1120 | 2.5 | 2.5 | 2.5 | 2.5 | 2.5 |
| N-Benzylpropane-1,2-diamine | 10.4 | 7.0 | — | — | — |
| Gaskamine ® 240 | — | — | 19.5 | — | — |
| Jeffamine ® D-230 | — | — | — | 11.4 | — |
| Jeffamine ® D-400 | — | 7.0 | — | — | 21.8 |
| Ancamine ® K54 | 1.2 | 1.2 | 1.2 | 1.2 | 1.2 |
| Viscosity [Pa · s] | 11.7 | 10.8 | 13.8 | 12.1 | 7.1 |
| TFT [min.] | 35 | 30 | 35 | 40 | 35 |
| Appearance | almost transparent | opaque-transparent | transparent | almost transparent | transparent |
| 10 d SC: | | | | | |
| Tensile strength [MPa] | 8.7 | 9.8 | 7.4 | 6.9 | 6.0 |
| Elongation at break | 140% | 139% | 93% | 103% | 71% |
| Modulus of elasticity 5% [MPa] | 48.4 | 26.0 | 66.5 | 39.1 | 40.8 |
| Tear resist. [N/mm] | 20.2 | 14.1 | 21.2 | 13.5 | 14.3 |

"Tear resist." stands for "tear resistance"

TABLE 2

Composition and properties of examples Z-4 to Z-7 and of comparative examples Ref-3 to Ref-4.

| | Example | | | | | |
|---|---|---|---|---|---|---|
| | Z-4 | Z-5 | Ref-3 | Z-6 | Z-7 | Ref-4 |
| Component-1: | | | | | | |
| STP Polymer-1 | 50.0 | 50.0 | 50.0 | 40.0 | 40.0 | 40.0 |
| Araldite ® GY 250 | 48.0 | 48.0 | 48.0 | 48.0 | 48.0 | 48.0 |
| DBTDL 10% | 2.0 | 2.0 | 2.0 | 2.0 | 2.0 | 2.0 |
| Dioctyl adipate | — | — | — | 5.0 | 5.0 | 5.0 |
| Vinyltrimethoxysilane | — | — | — | 5.0 | 5.0 | 5.0 |
| Component-2: | | | | | | |
| Silquest ® A-1120 | 0.3 | 0.6 | 0.6 | 0.3 | 0.6 | 0.6 |
| N-Benzylpropane-1,2-diamine | 15.3 | — | — | 15.3 | — | — |
| Gaskamine ® 240 | — | 28.7 | — | — | 28.7 | — |
| Jeffamine ® D-400 | — | — | 23.9 | — | — | 23.9 |
| Vestamin ® TMD | — | — | 2.8 | — | — | 2.8 |
| Ancamine ® K54 | 0.4 | 0.8 | 0.7 | 0.4 | 0.8 | 0.7 |
| Viscosity [Pa · s] | 34.4 | 37.7 | 24.4 | 7.9 | 9.5 | 6.4 |
| TFT [min.] | 40 | 110 | 40 | 85 | 100 | 40 |
| Appearance | opaque-transp. | opaque-transp. | opaque-transp. | opaque-transp. | opaque-transp. | opaque-transp., streaking |
| 14 d SC: | | | | | | |

TABLE 2-continued

Composition and properties of examples Z-4 to Z-7 and of comparative examples Ref-3 to Ref-4.

|  | Z-4 | Z-5 | Ref-3 | Z-6 | Z-7 | Ref-4 |
|---|---|---|---|---|---|---|
| Tensile strength [MPa] | 4.9 | 7.4 | 6.7 | 4.2 | 6.6 | 6.1 |
| Elongation at break | 120% | 81% | 80% | 80% | 67% | 61% |
| Modulus of elasticity 5% [MPa] | 5.6 | 7.9 | 13.2 | 8.3 | 11.7 | 10.3 |
| Tear resist. [N/mm] | 5.0 | 5.2 | 6.5 | 6.2 | 6.0 | 8.3 |
| Shore A top/bottom | 78/75 | 80/79 | 88/78 | 75/74 | 82/80 | 81/74 |

"Tear resist." stands for "tear resistance";
"transp." stands for "transparent"

TABLE 3

Composition and properties of examples Z-8 to Z-10 and of comparative examples Ref-5 to Ref-8.

|  | Z-8 | Z-9 | Z-10 | Ref-5 | Ref-6 | Ref-7 | Ref-8 |
|---|---|---|---|---|---|---|---|
| Component-1: | | | | | | | |
| STP Polymer-1 | 32.8 | 32.8 | 32.8 | 32.8 | 32.8 | 32.8 | 32.8 |
| Araldite ® GY 250 | 66.5 | 66.5 | 66.5 | 66.5 | 66.5 | 66.5 | 66.5 |
| DBTDL 10% | 0.7 | 0.7 | 0.7 | 0.7 | 0.7 | 0.7 | 0.7 |
| Component-2: | | | | | | | |
| Silquest ® A-1120 | 5.0 | 5.0 | 5.0 | 5.0 | 5.0 | 5.0 | 5.0 |
| N-Benzylpropane-1,2-diamine | 17.0 | 8.5 | — | — | — | — | — |
| Gaskamine ® 240 | — | — | 33.0 | — | — | — | — |
| Jeffamine ® D-230 | — | 9.5 | — | 19.0 | — | — | — |
| Vestamin ® TMD | — | — | — | — | 13.0 | — | — |
| Vestamin ® IPD | — | — | — | — | — | 14.0 | — |
| EP adduct 1 | — | — | — | — | — | — | 34.0 |
| Viscosity [Pa · s] | 6.6 | 6.3 | 8.7 | 5.6 | 7.4 | 11.3 | 21.4 |
| TFT [min.] | 140 | 120 | 105 | 120 | 91 | 100 | 90 |
| Appearance | nontransp. white | opaque-transp. | opaque-transp. | opaque-transp. | nontransp. white | nontransp. white | nontransp. white |
| 10 d SC | | | | | | | |
| Tensile strength [MPa] | 10.3 | 11.7 | 14.0 | 11.3 | 3.6 | 4.8 | 4.9 |
| Elongation at break | 8% | 10% | 12% | 9% | 8% | 9% | 66% |
| Modulus of elasticity 5% [MPa] | 188 | 186 | 149 | 183 | 47 | 58 | 21 |
| +2 d 80° | | | | | | | |
| Tensile strength [MPa] | 11.6 | 15.2 | 18.2 | 14.2 | 3.6 | 4.9 | 4.0 |
| Elongation at break | 6% | 8% | 10% | 14% | 6% | 5% | 16% |
| Modulus of elasticity 5% [MPa] | 206 | 243 | 231 | 209 | 59 | 86 | 46 |

"nontransp." stands for "nontransparent"
"transp." stands for "transparent"

The invention claimed is:

1. A composition comprising
    at least one polymer containing silane groups,
    at least one epoxy resin, and
    at least one amine of the formula (I)

$$(Y)_n - Q - (CHR)_m - NH - A - NH_2 \quad (I)$$

where
    A is selected from the group consisting of 1,2-ethylene, 1,2-propylene, and 1,3-propylene, R each independently is a hydrogen or methyl or phenyl radical, Q is a five-, six- or seven-membered cycloalkyl, or an aryl radical having 4 to 7 carbon atoms, or an aryl radical having an oxygen, sulfur or nitrogen atom in the ring and having 4 to 7 carbon atoms, Y represents identical or different radicals selected from the group consisting of alkyl, alkoxy and dialkylamino, each having 1 to 18 carbon atoms, m is 1 or 2, and n is 0 or 1 or 2 or 3.

2. The composition as claimed in claim 1, wherein the polymer containing silane groups is a polyether containing silane groups.

3. The composition as claimed in claim 1, wherein it has a content of polymer containing silane groups in the range from 5 to 80 weight %.

4. The composition as claimed in claim 1, wherein the epoxy resin is a liquid resin based on a diglycidyl ether of bisphenol A, of bisphenol F or of bisphenol A/F.

5. The composition as claimed in claim 1, wherein it has an epoxy resin content in the range from 15 to 70 weight %.

6. The composition as claimed in claim 1, wherein A is 1,2-propylene, R is a hydrogen radical, Q is a phenyl radical, m is 1 and n is 0.

7. The composition as claimed in claim 1, wherein R is a hydrogen radical, Q is a phenyl radical, m is 1 and n is 0.

8. The composition as claimed in claim 1, wherein it has a content of amine of the formula (I) in the range from 1 to 35 weight %.

9. The composition as claimed in claim 1, wherein it additionally comprises at least one aminosilane.

10. The composition as claimed in claim 1, wherein it is a two-component composition consisting of a first component and a second component, which are produced, packed and stored separately from one another, the amine of the formula (I) not being present in the same component as the epoxy resin.

11. The composition as claimed in claim 1, wherein it additionally comprises at least one further amine, which does not conform to the formula (I), and/or at least one accelerator.

12. A cured composition obtained from the composition as claimed in claim 1 by mixing all of the ingredients and/or components of the composition, applying the mixed composition and curing the applied composition.

13. A method comprising applying the composition as claimed in claim 1 to a substrate, wherein the composition is applied to the substrate as adhesive and/or sealant or as coating.

14. A bonded and/or sealed or coated article obtained from the method as claimed in claim 13, the article comprising an at least partly cured form of the composition.

15. The composition as claimed in claim 1, wherein A is 1,2-ethylene.

16. The composition as claimed in claim 1, wherein A is 1,2-propylene.

17. A composition comprising:
at least one polymer containing silane groups,
at least one epoxy resin, and
at least one amine of the formula (I)

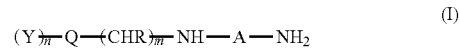

where

A is selected from the group consisting of 1,2-ethylene, 1,2-propylene, 1,3-propylene, 2-methyl-1,5-pentylene, 1,6-hexylene, 2,2(4),4-trimethyl-1,6-hexylene, 1,3-cyclohexylenebis(methylene), (1,5,5-trimethylcyclohexan-1-yl)methane-1,3, 3-aza-1,5-pentylene, 3,6-diaza-1,8-octylene, 3,6,9-triaza-1,11-undecylene, 4-aza-1,7-heptylene, 3-aza-1,6-hexylene, 4,7-diaza-1,10-decylene, and 7-aza-1,13-tridecylene, R in each case is a hydrogen radical, Q is a phenyl radical, m is 2, n is 0, and Y represents identical or different radicals selected from the group consisting of alkyl, alkoxy and dialkylamino, each having 1 to 18 carbon atoms.

18. A composition comprising:
at least one polymer containing silane groups,
at least one epoxy resin, and
at least one amine of the formula (I)

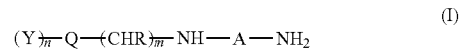

where

A is selected from the group consisting of 3,6-diaza-1,8-octylene, 3,6,9-triaza-1,11-undecylene, 4,7 diaza-1,10-decylene, and 7-aza-1,13-tridecylene, R each independently is a hydrogen or methyl or phenyl radical, Q is a five-, six- or seven-membered cycloalkyl, or an aryl radical having 4 to 7 carbon atoms, or an aryl radical having an oxygen, sulfur or nitrogen atom in the ring and having 4 to 7 carbon atoms, Y represents identical or different radicals selected from the group consisting of alkyl, alkoxy and dialkylamino, each having 1 to 18 carbon atoms, m is 1 or 2, and n is 0 or 1 or 2 or 3.

* * * * *